(12) United States Patent
Venkatsubra et al.

(10) Patent No.: US 8,204,027 B2
(45) Date of Patent: Jun. 19, 2012

(54) ADMINISTERING REQUESTS FOR DATA COMMUNICATIONS CONNECTIONS IN A WIDE AREA NETWORK THAT INCLUDES A PLURALITY OF NETWORKS

(75) Inventors: Venkat Venkatsubra, Austin, TX (US); Richard Perry Youngman, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 2113 days.

(21) Appl. No.: 11/122,609

(22) Filed: May 5, 2005

(65) Prior Publication Data

US 2006/0268874 A1     Nov. 30, 2006

(51) Int. Cl.
*H04W 4/00* (2009.01)
*H04L 12/66* (2006.01)
*H04L 12/28* (2006.01)

(52) U.S. Cl. ......... 370/338; 370/352; 370/392; 370/401
(58) Field of Classification Search ................... 370/338
See application file for complete search history.

(56) References Cited

U.S. PATENT DOCUMENTS 7,194,004 B1 * 3/2007 Thomsen ...................... 370/401
7,305,365 B1 * 12/2007 Bhela et al. ..................... 705/51
2002/0150083 A1 * 10/2002 Fangman et al. ............. 370/352
2003/0233576 A1 * 12/2003 Maufer et al. ................ 713/201
2004/0087274 A1 * 5/2004 Ekberg et al. ................ 455/41.2
2006/0187891 A1 * 8/2006 Sairanen ....................... 370/338
2006/0291434 A1 * 12/2006 Gu et al. ....................... 370/338

OTHER PUBLICATIONS

U.S. Appl. No. 10/763,100, filed Jan. 22, 2004, Dwip Banerjee et al. Hidalgo; Algorithm to Connect Clients to a Database Server Based on the Transmission Control Protocol/Internet Protocol Sockets; TDB; Jul. 1994; pp. 305-308; v37, n7; US.

* cited by examiner

*Primary Examiner* — Brandon Renner
(74) *Attorney, Agent, or Firm* — DeLizio Gilliam, PLLC

(57) ABSTRACT

Methods, system, and products are disclosed for administering requests for data communications connections in a wide area network that include receiving, according to a data communications protocol, by a receiver from a sender, a request for a data communications connection, wherein the sender has a network address on a sender's network and the receiver has a network address on a receiver's network; characterizing the sender as local with respect to the receiver's network if the sender's network is the receiver's network; characterizing the sender as remote with respect to the receiver's network if the sender's network is not the receiver's network; and responding to the request in dependence upon a value of a location response flag and in dependence upon the characterization of the sender's network with respect to the receiver's network.

13 Claims, 8 Drawing Sheets

ADMINISTERING REQUESTS FOR DATA COMMUNICATIONS CONNECTIONS IN A WIDE AREA NETWORK THAT INCLUDES A PLURALITY OF NETWORKS

BACKGROUND OF THE INVENTION

1. Field of the Invention

The field of the invention is data processing, or, more specifically, methods, systems, and products for administering requests for data communications connections in a wide area network that includes a plurality of networks.

2. Description of Related Art

Standard response messages in data communications protocols by the nature of their standard replies yield information useful to an attacker. Sending a reset message when an attacker requests a connection to a closed port advises the attacker that a communication module is active on the network address, for example. A synchronize message advises the attacker not only that a data communications module exists at the network address but also that an open port is active at that address. The attacker may or may not be able to effect a connection through the intended victim's security restraints, but the attacker now knows something is there to be attacked. Security restraints are typically applied at the application level of the protocol stack. Hostile access of data communications ports cannot currently be mitigated at the level of the transmission protocol or the network protocol.

SUMMARY OF THE INVENTION

Methods, systems, and products are described that operate generally to enable an application to instruct a data communications module in the transmission protocol layer to security constraints according to a characterization of a sender as local or remote with respect to a receiver's network location. More particularly, methods, systems, and products are disclosed for administering requests for data communications connections in a wide area network that include receiving, according to a data communications protocol, by a receiver from a sender, a request for a data communications connection, wherein the sender has a network address on a sender's network and the receiver has a network address on a receiver's network; characterizing the sender as local with respect to the receiver's network if the sender's network is the receiver's network; characterizing the sender as remote with respect to the receiver's network if the sender's network is not the receiver's network; and responding to the request in dependence upon a value of a location response flag and in dependence upon the characterization of the sender's network with respect to the receiver's network. Typical embodiments also include setting the value of the location response flag by an application program's subroutine call through an application programming interface for the data communications protocol.

Responding to the request may include dropping the request if the value of the location response flag is set to 'local' and the sender is characterized as remote. Responding to the request may include dropping the request if the value of the location response flag is set to 'remote' and the sender is characterized as local. In many embodiments, the receiver has a receiver port having a state, and responding to the request may include responding to the request in dependence upon the receiver port state. When the port is open on the receiver, responding to the request may be carried out by accepting the request if the value of the location response flag is set to 'local' and the sender is characterized as local. When the port is closed on the receiver, responding to the request may include denying the request if the value of the location response flag is set to 'local' and the sender is characterized as local. When the port is open on the receiver, responding to the request may include accepting the request if the value of the location response flag is set to 'remote' and the sender is characterized as remote. When the port is closed on the receiver, responding to the request may be carried out by denying the request if the value of the location response flag is set to 'remote' and the sender is characterized as remote.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for administering requests for data communications connections in a wide area network that includes a plurality of networks. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Figure 1:
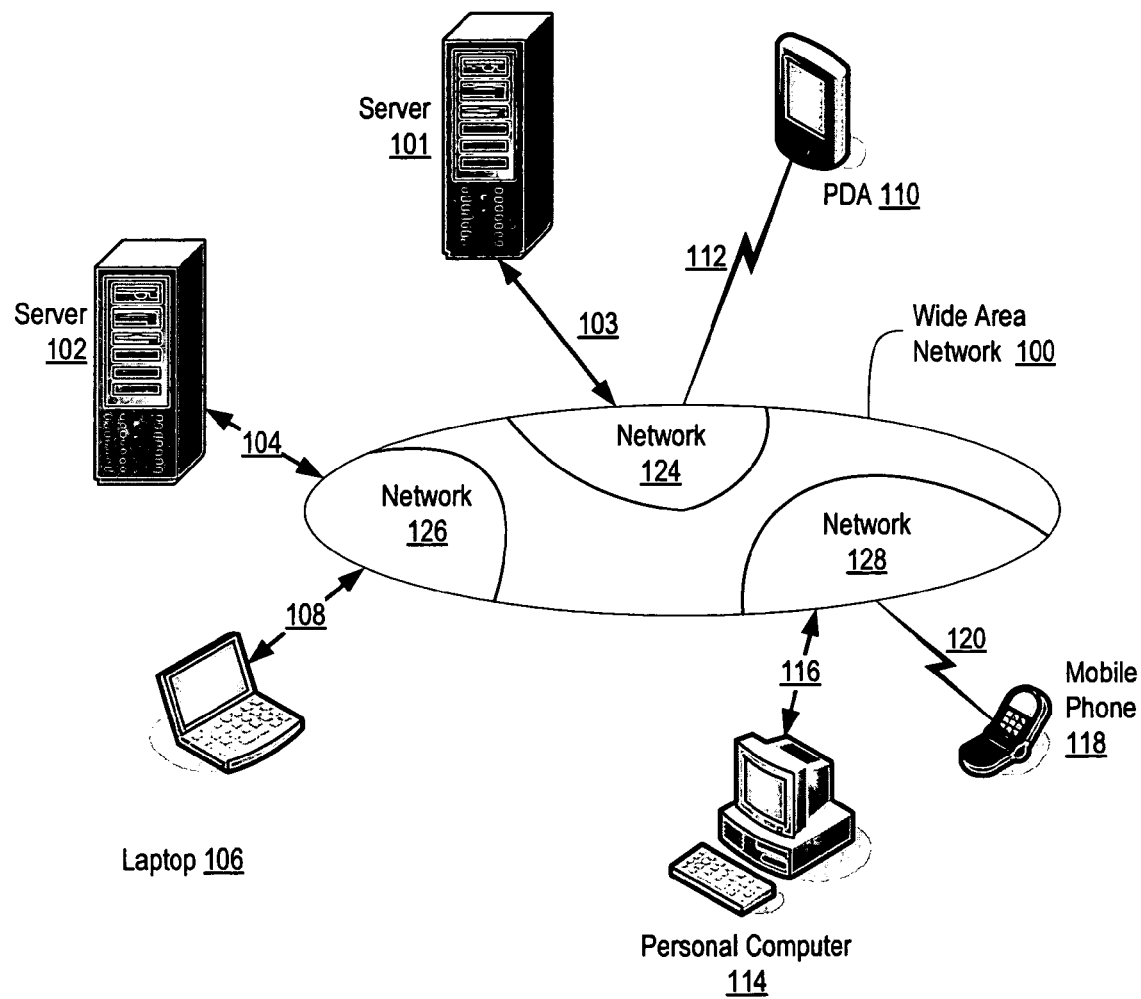
FIG. 1 sets forth a network diagram illustrating an exemplary system for administering requests for data communications connections according to embodiments of the present invention.

Administering Requests for Data Communications Connections in a Wide Area Network that Includes a Plurality of Networks Exemplary methods, systems, and products for administering requests for data communications connections according to embodiments of the present invention are described with reference to the accompanying drawings, beginning with FIG. 1. FIG. 1 sets forth a network diagram illustrating an exemplary system for administering requests for data communications connections according to embodiments of the present invention. The system of FIG. 1 operates generally to administer requests for data communications connections according to embodiments of the present invention receiving, by a receiver from a sender, a request for a data communications connection, where the sender has a network address on a sender's network and the receiver has a network address on a receiver's network; characterizing the sender as local or remote with respect to the receiver's network; and responding to the request in dependence upon a value of a location response flag and in dependence upon the characterization of the sender's network with respect to the receiver's network.

The system of FIG. 1 includes a wide area network ('WAN') (100) that includes several networks (124, 126, 128). A WAN is a computer network that spans a relatively large geographical area. Computers connected to a wide-area network are often connected through public networks, telephone networks, internetworks, and so on. They can also be connected through leased lines or satellites. The largest WAN in existence is the Internet, a network of computers that carry out data communications according to the Internet Protocol ('IP'). A WAN typically includes two or more other networks, sometimes referred to as networks or local area networks ('LANs'), but which are referred to generally in this specification as 'networks.' More specifically, a 'network' as the term is used in this specification includes nodes having the same network address. That is, the network portion of the two addresses is the same, including any subnet portion of the address, but excluding the node portion of the network address.

A portion of an address identifies the network to which a node is connected. In a 32-bit class A address, the leftmost 8 bits identify the network and the rightmost 24 bits identify a particular node on that network. In a 32-bit class B address, the leftmost 16 bits identify the network and the rightmost 16 bits identify a particular node on that network. In a 32-bit class C address, the leftmost 24 bits identify the network and the rightmost 8 bits identify a particular node on that network.

The idea of making the boundary between the network and node more flexible is known as 'subnetting.' Each node has a network mask used to identify its network. Each network mask typically is made of some number of contiguous binary 1's beginning at the top of the address, eight 1's for a class A network, sixteen for class B, and so on. Subnetting allows a mask with more that eight 1's for class A, more than sixteen 1's for class B, and more than twenty-four 1's for class C.

The portion of a class A address that has 1's in the bottom three octets of its mask may be called a subnet. For a class B address, the 1 bits in the bottom two octets of the address mask correspond to the subnet. And for a class C address, the 1 bits in the bottom octet correspond to the subnet. Addresses therefore may be viewed as having three fields: a net number, a subnet number, and a node number. In a class B address, for example, the top two octets would be the net portion, any bits in the bottom two octets corresponding to 1's in the mask would be the subnet portion, and the remainder of the bottom two octets would be the node portion of the address.

In this specification, the term 'network' corresponds to the portion of an address that corresponds to 1's in an applicable mask, regardless whether the address includes a subnet. For example therefore in this specification:

A class A network without subnetting may be identified by the portion of an address corresponding to the top octet of its mask;

A class A network with subnetting and a mask with 1's in its top 12 bits may be identified by the portion of an address corresponding to the top 12 bits of the mask;

A class A network with subnetting and a mask with 1's in its top 14 bits may be identified by the portion of an address corresponding to the top 14 bits of the mask;

A class B network without subnetting may be identified by the portion of an address corresponding to the top two octets of its mask;

A class B network with subnetting and a mask with 1's in its top 20 bits may be identified by the portion of an address corresponding to the top 20 bits of the mask;

A class B network with subnetting and a mask with 1's in its top 23 bits may be identified by the portion of an address corresponding to the top 23 bits of the mask;

A class C network without subnetting may be identified by the portion of an address corresponding to the top three octet of its mask;

A class C network with subnetting and a mask with 1's in its top 27 bits may be identified by the portion of an address corresponding to the top 27 bits of the mask; and A class C network with subnetting and a mask with 1's in its top 29 bits may be identified by the portion of an address corresponding to the top 29 bits of the mask.

And so on.

The system of FIG. 1 includes a number of nodes connected for data processing in a network. A node is a computer coupled to a network for data communications. In Unix parlance, a node is referred to as a 'host.' RFC793, the original Transmission Control Protocol ('TCP') specification from 1983, for example, refers to nodes as hosts. The 'node' terminology is somewhat more generic. Therefore 'node' is the terminology used in this specification to refer to a computer on a network.

Each of the nodes of the system of FIG. 1 may have a data communications module installed upon it capable of administering requests for data communications connections according to the present invention. The data processing system of FIG. 1 includes servers (101, 102) connected to a wide-area network ('WAN') (100) through wireline connections (103, 104). Several other exemplary devices including a laptop (106), a personal digital assistant ('PDA') (110), a personal computer (114), and a network-enabled mobile phone (118) also connect to the WAN (100). In the example of FIG. 1, laptop (106) connects through a wireline connection (108) to WAN (100), and personal computer (114) connects through a wireline connection (116) to WAN (100). PDA (110) connects through wireless link (112) to WAN (100), and mobile phone (118) connects through wireless link (120) to WAN (100). Servers (101, 102) may provide a wide variety of services through network (100) to other network devices (106, 110, 114, and 118) that include, for example, HTTP or 'web' services, email services, instant messaging service, security services, applications services, and others as will occur to those of skill in the art.

In the system of FIG. 1, any exemplary device (101, 102, 106, 110, 114, and 118) may function as a 'sender' or a 'receiver' of a data communications connection according to the present invention. In the terminology of this specification, a 'sender' is any node or process thereof capable of requesting a service or data provided by another node or process thereof. A physical device such as a server, a laptop, a PDA, or a desktop can be a sender. An application running on a node that relies on communication with another node can also be a sender. Such applications include e-mail clients, FTP clients and so on. A 'receiver' is a node or process thereof on an internet or other network that responds to requests or commands from a sender. Types of receivers include FTP servers, IRC servers, mail servers, news servers, web servers and so on. Any node or node process can function as a sender or a receiver, the distinguishing feature being the function rather than the device or process. When a server (101, 102) receives a request for services from another network device (106, 110, 114, and 118), the server (101, 102) functions as a receiver, and the other network device (106, 110, 114, and 118) functions as a sender. When a server (101, 102) responds to the network device (106, 110, 114, and 118) originating the service request, the server (101, 102) functions as a sender, and the other network device (106, 110, 114, and 118) functions as a receiver.

A sender may be characterized as 'local' or 'remote' depending on the sender's network location relative to a receiver. A sender having a network address on the network of the receiver may be characterized as 'local.' A sender having a network address on a network other than the receiver's network may be characterized as 'remote.' In the example of FIG. 1, server (102) and laptop (106) are both connected to network (126); the network portions of their addresses are the same. When laptop (106) sends a connection request to server (102), server (102) may examine the sender's network address, determine that the sender's network and the receiver's network are the same, characterize the sender as local, check the value of its location response flag, and, if the flag is to 'local,' accept the connection. If the flag was set to 'remote,' the receiver may drop the request without sending any response at all, thereby denying a potential attacker any information whatsoever regarding the receiver. Similarly, server (101) on network (124), upon receiving a connection request sent from personal computer (114), a node on another network (128), may characterize the sender as remote, and, if the receiver's location response flag is set to 'remote,' server (101) on network (124) will accept the connection. If the server's (101) location response flag was set to 'local,' the server may drop the request without response.

The arrangement of nodes and network connections making up the exemplary system illustrated in FIG. 1 is for explanation, not for limitation. In fact, systems for administering requests for data communications connections according to embodiments of the present invention may include additional servers, routers, other devices, and peer-to-peer architectures, not shown in FIG. 1, as will occur to those of skill in the art. Systems for administering requests for data communications connections according to embodiments of the present invention may be connected as LANs, WANs, intranets, internets, the Internet, webs, the World Wide Web itself, or other connections as will occur to those of skill in the art. Such networks are media that may be used to provide data communications connections between various nodes connected together within an overall data processing system. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 1.

Administering requests for data communications connections in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary computer (152) useful in administering requests for data communications connections according to embodiments of the present invention. The computer (152) of FIG. 2 includes at least one computer processor (156) or 'CPU' as well as random access memory (168) ('RAM') which is connected through a system bus (160) to processor (156) and to other components of the computer. Stored in RAM (168) is an application program (151). Application programs useful in accordance with various embodiments of the present invention include browsers, word processors, spreadsheets, database management systems, email clients, FTP clients, TELNET clients, proxy services, and so on, as will occur to those of skill in the art. Application program (151) in the example of FIG. 2 is shown in RAM (168), but many components of such software typically are stored in non-volatile memory (166) also.

Also stored in RAM (168) is an operating system (154). Operating systems useful in computers according to embodiments of the present invention include UNIX™, Linux™, Microsoft NT™, AIX™, IBM's i5/OS™, and others as will occur to those of skill in the art. Transport and network layer software components such as TCP/IP clients and services are typically provided as components of operating systems, including Microsoft Windows™, IBM's AIX™, Linux™, and so on.

Operating system (154) includes a data communications module (186) such as a TCP service. Data communications module (186) of FIG. 2 includes computer program instructions for administering requests for data communications connections according to embodiments of the present invention. Operating system (154) and data communications module (186) in the example of FIG. 2 are shown in RAM (168), but many components of such software typically are stored in non-volatile memory (166) also.

Figure 2:
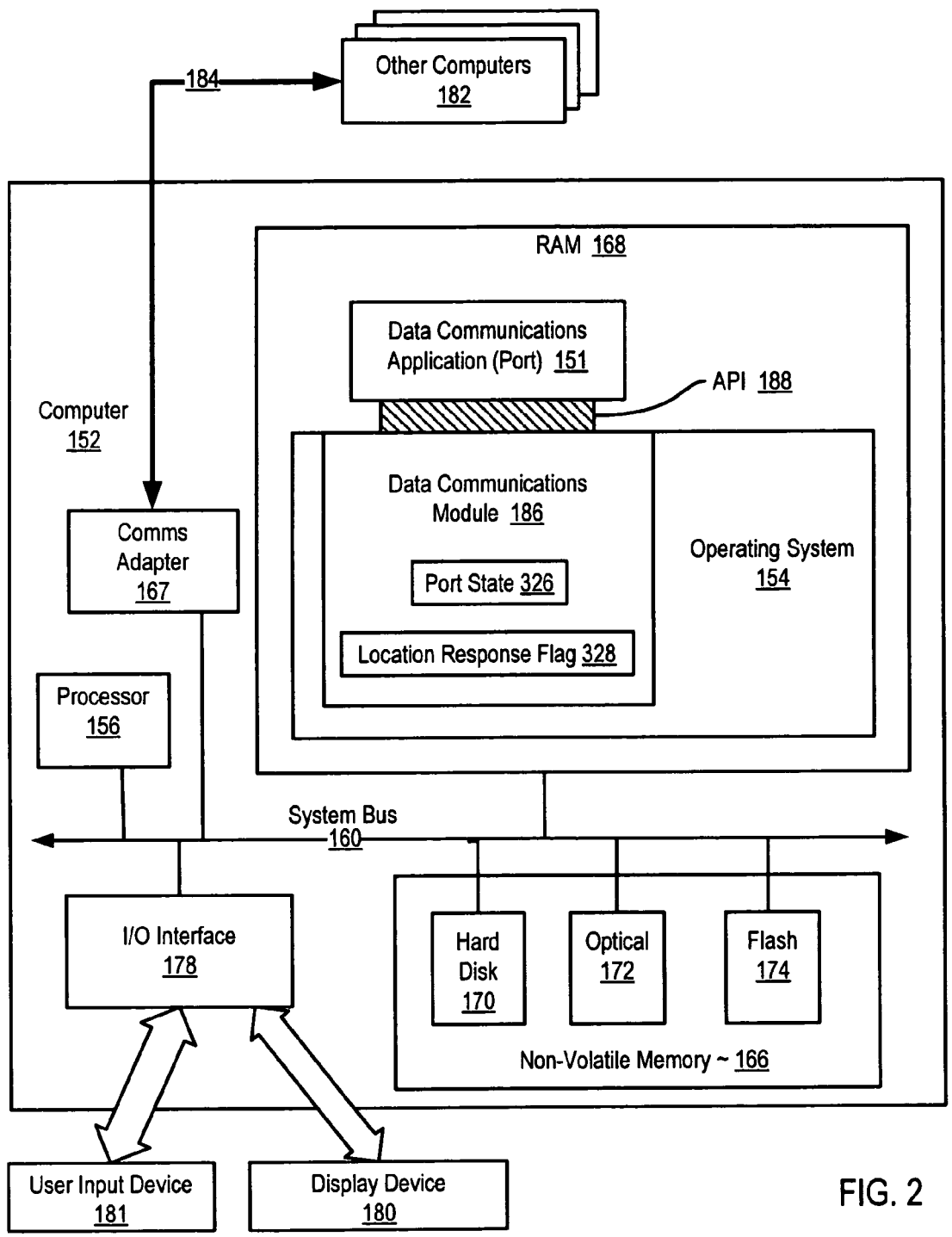
FIG. 2 sets forth a block diagram of automated computing machinery comprising an exemplary computer useful in administering requests for data communications connections according to embodiments of the present invention.

Data communications module (186) of FIG. 2 provides one end of a data communications connection to application program (151) through an API (188). In TCP parlance, the endpoint of a data communications connection is a data structure called a 'socket.' Two sockets form a data communications connection, and each socket includes a port number and a network address for the respective data connection endpoint. Using the data communications connection, a node's application program operating in the software layer of the OSI data communications has the ability to send information to an application program of another node without regard for how the information travels from one node on a network to another. For example, a laptop's email client can send a request for new email messages to a mail server application through a socket to the TCP service on a laptop. The mail server application then receives the email client's request through a socket to the TCP service on the server and responds by sending the new email messages back through the socket to the server's TCP service. In the process of sending and receiving messages through the sockets, neither the email client nor the mail server has to manage the details of how the messages are delivered.

Application (151) uses sockets in the data communications module (186) through a set of functions supplied by the API (188). TCP's API provides a set of functions that include, for example:

| | |
|---|---|
| listen( ) | activates a socket, instructing the data communications module that a server port is ready to begin operations, begin accepting connections on a socket |
| accept( ) | accepts a connection on a socket from the subsystem on a server |
| acceptEx( ) | accepts a new connection on a server and receives the first block of data sent by a client |
| connectEx( ) | requests a connection to a server from a client through a specified socket and optionally sends data when the connection is established |
| connect( ) | requests a connection to a server from a client on a specified socket |
| send( ) | sends a message through a connection on a server or a client |
| recv( ) | retrieves from the subsystem a message received on a connection to a calling application on a server or a client |

Data communications module (186) also includes a location response flag (328). As described in more detail below, data communications module (186) may be programmed for administering requests for data communications connections according to embodiments of the present invention in dependence upon characterization of a sender as local or remote and also in dependence upon the value of the location response flag (328).

A port in a socket identifies a data communications application that carries out data communications operations through the socket. Each such port is said to have a state. This specification addresses two port states: open and closed. A closed port is a port that either does not exist or has not been instructed to listen. A closed port may not exist because no socket for it has been created. When a port exists, it is still considered closed until its socket is instructed to listen, by an application program calling listen( ) in the sockets API. An open port is a port that exists and has been instructed to listen. In the example of FIG. 2, data communications module (186) also includes a data element (326) representing the state of a port served by the data communications module. Data communications module (186) may be programmed for administering requests for data communications connections according to embodiments of the present invention not only in dependence upon dependence upon characterization of a sender as local or remote but also in dependence upon the receiver port state, that is, whether the port identified in a connection request is open in the receiver.

Data communications application (186) may be programmed to set the value of the location response flag by a subroutine call through application programming interface (188) for the data communications protocol. In the case of TCP, the API for the data communication protocol would be the sockets API. The sockets API are expanded according to embodiments of the present invention to expose an interface to a function that sets the value of the location response flag. Providing such a function empowers the application program, and therefore the application programmer, to determine how the data communications module is to administer, requests for data communications connections according to embodiments of the present invention. As described in more detail below, it is the value of the location response flag (328) that indicates whether to respond to requests according to the sender's characterization as local or remote. Supported values of the location response flag (328) typically include 'local' and 'remote.' An example of an API function for setting the value of a location response flag is:

| | |
|---|---|
| setLocResp( ) | sets a location response flag to the value of a call parameter; may accept a parameter with value 'local' or 'remote.' |

Computer (152) of FIG. 2 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182). Such data communications may be carried out through serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 3:
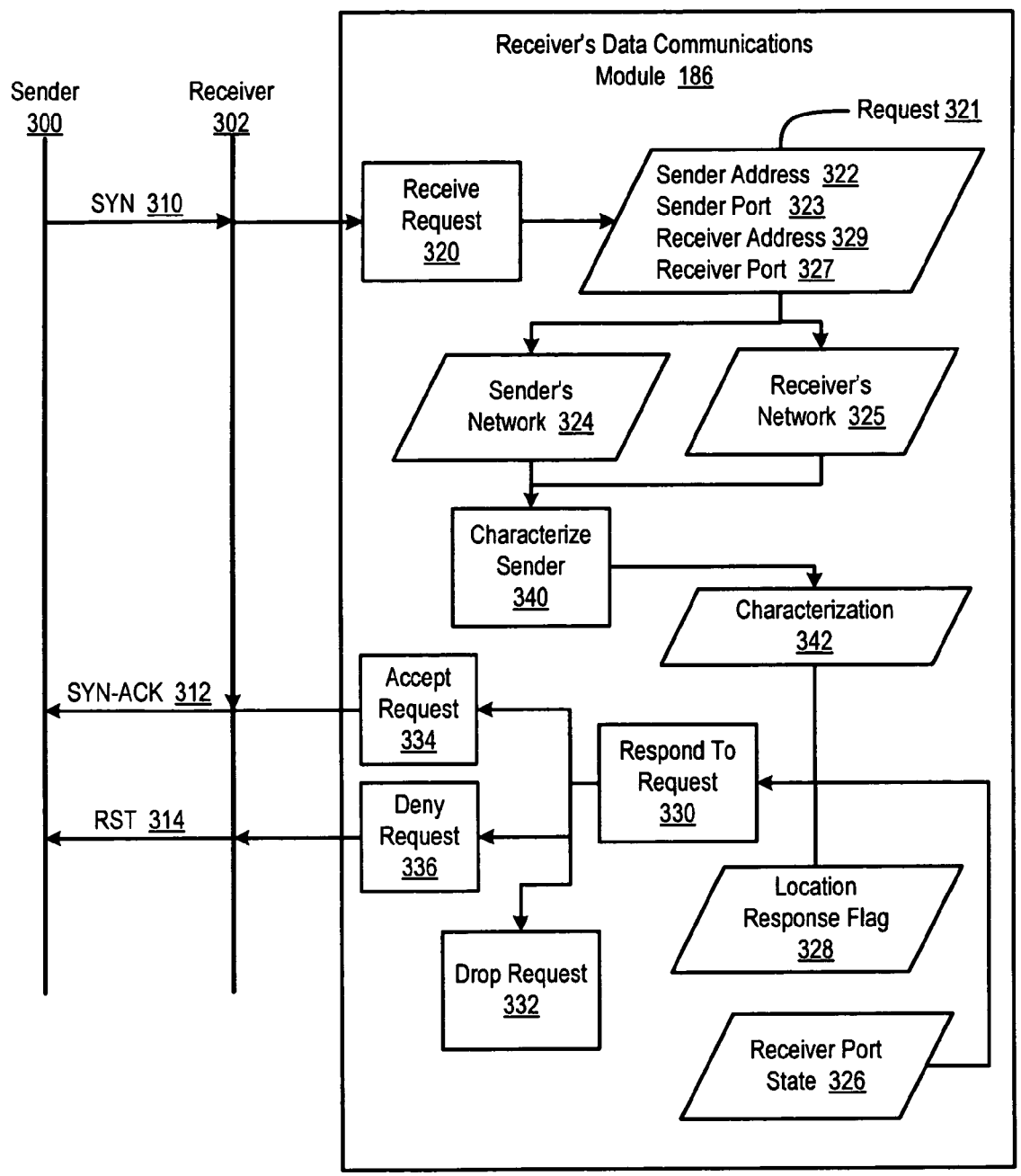
FIG. 3 sets forth a calling sequence diagram and flow chart illustrating an exemplary method for administering requests for data communications connections according to embodiments of the present invention.

For further explanation, FIG. 3 sets forth a calling sequence diagram and flow chart illustrating an exemplary method for administering requests for data communications connections according to embodiments of the present invention. The method of FIG. 3 includes receiving (320), according to a data communications protocol, by a receiver (302) from a sender (300), a request (321) for a data communications connection, wherein the sender has a network address (322) on a sender's network (324) and the receiver has a network address (329) on a receiver's network (325).

A sender (300) is any node or process thereof on a network capable of requesting a service or data provided by another node or process thereof on the network. A receiver (302) is any computer or process thereof on a network that responds to requests or commands from a sender. The sender (300) communicates with the receiver (302) by a data communications protocol, such as TCP. Examples in this specification are often describe with respect to TCP, but the use of TCP is not a requirement or limitation of the present invention. Administering requests for data communications connections according to embodiments of the present invention may be implemented through any connection-oriented protocol, including, for example, the Sequence Packet Exchange ('SPX') protocol and others as will occur to those of skill in the art, and the use of all such protocols is well within the scope of the present invention.

In the example of FIG. 3, a sender's (300) TCP service initiates a data communications connection by sending the synchronize ('SYN') (310) message of FIG. 3 to a receiver's (302) TCP service. The sender's (300) TCP service transmits the SYN (310) message through a sender port assigned to the particular socket on the sender (300) by the TCP service. The sender's (300) TCP service may have initiated the SYN (310) message in response to an application program calling the 'connect( )' function for a particular socket on the sender (300). Transmitting a SYN (310) message is the first step to establishing a data communications connection in TCP.

In the example of FIG. 3, receiving (320), according to a data communications protocol, by a receiver (302) from a sender (300), a request (321) for a data communications connection may be carried out by a data communications module (186), such as a TCP service, installed on the receiver (302). Receiving (320) a connection request (321) from a sender (300) may include identifying a SYN (310) message as a request (321) for a data communications connection. Receiving (320) a connection request (321) may also include extracting information from the SYN (310) message and storing the extracted information in a connection request (321) data structure. The connection request data structure may be a structure used to represent a connection, such as, in the example of TCP, a Transmission Control Block or 'TCB.'

The connection request (321) of FIG. 3 includes a sender network address (322) and a sender port (323) that identifies a particular socket of the sender (300) requesting a data connection with the receiver (302). Similarly, the receiver network address (329) and the receiver port (327) included in the connection request (321) of FIG. 3 identifies the particular receiver socket for which the sender (300) requests a connection. Once a connection has been established between the sockets of the sender (300) and receiver (302), the sender (300) may transmit data through the sockets to the receiver (302). The receiver (302) may then respond to the sender (300) through the sockets as well. In TCP terminology, the receiver's data communications module (186) of FIG. 3 receives (320) the sender port (323) and the receiver port (327) from the TCP header of the SYN (310) message. In the method of FIG. 3, the receiver's data communications module (186) may obtain the sender network address (322) and the receiver network address (329) by API calls to the network layer of its protocol stack.

In the method of FIG. 3, the sender's network (324) and the receiver's network (325) are represented in data in a receiver's data communications module (186). The sender's network (324) and the receiver's network (325) store respective values representing the networks on which the sender and receiver are located. The sender (300) of FIG. 3 has a network address on the sender's network. Similarly, the receiver (302) of FIG. 3 has a network address on the receiver's network. As described in detail at FIG. 1, the sender's network and the receiver's network form portions of a larger wide-area network.

The method of FIG. 3 also includes characterizing (340) the sender (300). The sender (300) may be characterized as local with respect to the receiver's network (325) if the sender's network (324) is the receiver's network, and the sender (300) may be characterized (340) as remote with respect to the receiver's network (325) if the sender's network (324) is not the receiver's network. In the example of FIG. 3, characterizing (340) the sender (300) is carried out by a data communications module (186) on the receiver (302). In the method of FIG. 3, characterizing (340) the sender (300) provides a sender characterization (342) as data in the data communications module (186) on the receiver (302).

The method of FIG. 3 includes a location response flag (328) represented in data in a receiver's data communications module (186), such as a TCP service. The location response flag (328) supports values corresponding to 'local' and 'remote.' For example, 'local' may be stored in the location responds flag (328) as a binary '0', while 'remote' may be stored as a binary '1.' A value corresponding to 'local' indicates that the data communications module (186) does not respond to a remote sender, that is the TCP service drops the remote sender's SYN messages. A value of 'remote' indicates that the data communications module does not respond to a local sender, that is the TCP service drops the local sender's SYN messages. As mentioned above, a sender may be characterized as 'local' or 'remote' depending on the sender's network location relative to a receiver. A sender having a network address on the network of the receiver may be characterized as 'local.' A sender having a network address on a network other than the receiver's network may be characterized as 'remote.'

The method of FIG. 3 also includes responding (330) to the request (321) in dependence upon a value of a location response flag (328) and in dependence upon the characterization (342) of the sender's network (324) with respect to the receiver's network (325). In FIG. 3, responding (330) to the connection request (321) is carried out by a data communication module (186) installed on the receiver (302) such as a TCP service. Responding (330) to the connection request according to the method of FIG. 3 may include accepting (334) the connection request (321), denying (336) the connection request (321), or dropping (332) the connection request (321).

In the example of FIG. 3, accepting (334) the connection request (321) includes responding to the sender's SYN (310) message with a SYN and acknowledge ('ACK') (312) message, sometimes referred to as a SYN-ACK message. Accepting the connection request (321) according to FIG. 3 may be carried out in the receiver's TCP service by setting the SYN and ACK control bits of a TCP message header and transmitting the TCP message to the sender (300). Accepting (334) the connection request (321) with the SYN-ACK (312) message acknowledges the sender's SYN (310) and synchronizes the sender (300) with the receiver's (302) sequencing numbers. Responding with a SYN-ACK (312) informs the sender's (300) TCP service that the receiver's (302) TCP service accepts the request for a data communications connection on the receiver's port specified in the SYN (310) message. After responding with a SYN-ACK (312), the connection will be established when the receiver (302) receives an ACK (not shown) from the sender (300).

Denying (336) the connection request (321) according to the method of FIG. 3 includes responding to the sender's (300) SYN (310) with a reset ('RST') message. In the method of FIG. 3, denying (336) the connection request (321) may be carried out in the receiver's TCP service by setting the RST control bit of a TCP message header and transmitting the TCP message to the sender (300). Denying (336) the connection request with a RST (314) message informs the sender (300) that a TCP service on the receiver (302) refuses the connection request. Denying (336) with the RST (314) message however inform the sender (300) that the receiver's TCP service is monitoring the port specified by the sender's SYN (310) message.

In the example of FIG. 3, dropping (332) the connection request (321) may be carried out by the receiver's TCP service by discarding the connection request (321). Dropping (332) provides the sender (300) neither a SYN-ACK (312) message nor a RST (314) message. In contrast to accepting (334) or denying (336) the connection request, dropping (332) the connection request advantageously supplies no information to the sender (300) regarding the receiver (302). From the perspective of the sender (300), the SYN (310) message may appear lost or the receiver and port specified in the SYN (310) message may appear nonexistent.

Figure 4:
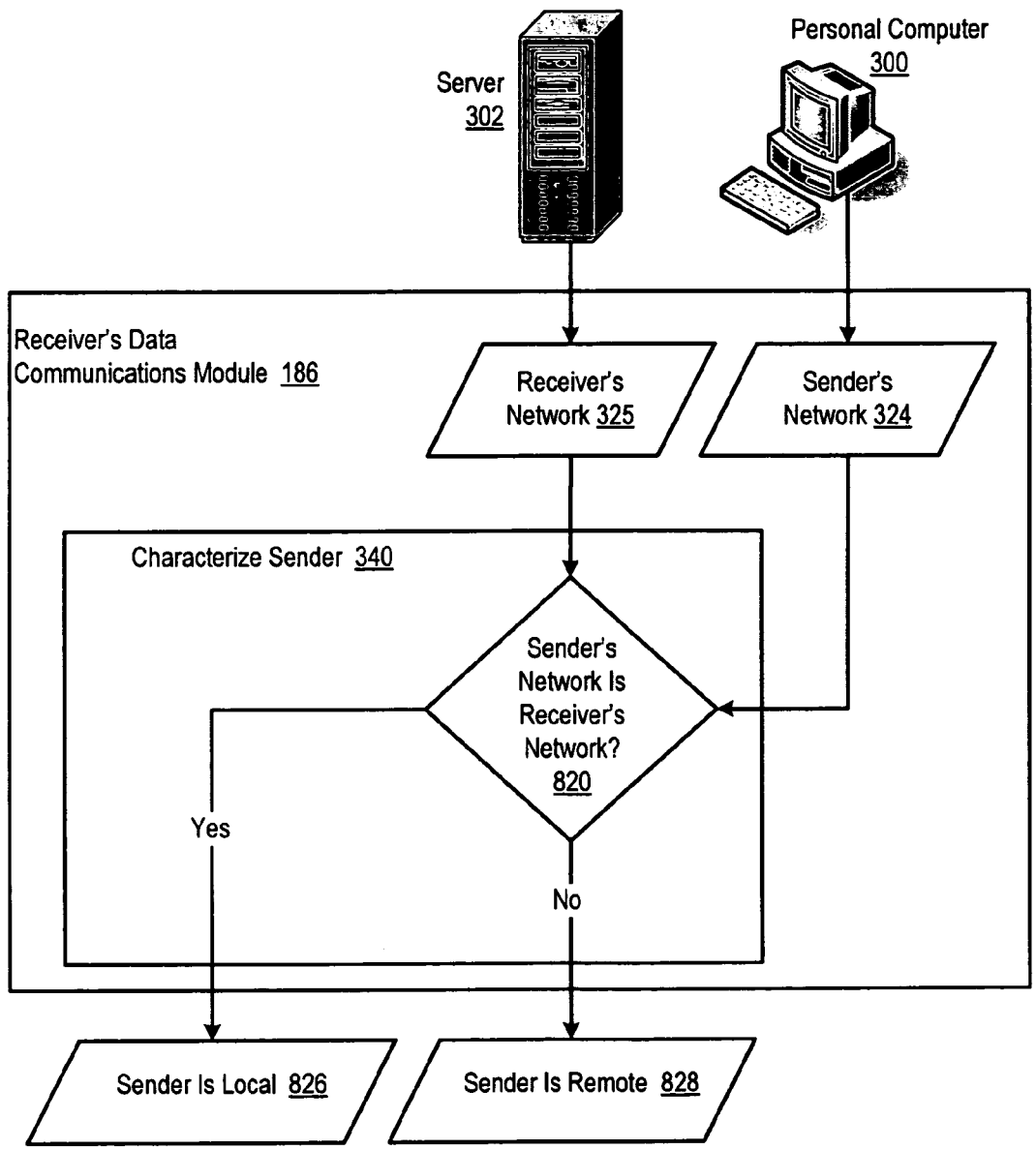
FIG. 4 sets forth a flow chart illustrating an exemplary method of characterizing a sender according to embodiments of the present invention.

For further explanation, FIG. 4 sets forth a flow chart illustrating an exemplary method of characterizing a sender according to embodiments of the present invention. The method of FIG. 4 includes characterizing (340) the sender (300) as local with respect to the receiver's network (325) if the sender's network (324) is the receiver's network. The method of FIG. 4 also includes characterizing (340) the sender (300) as remote with respect to the receiver's network (325) if the sender's network (324) is not the receiver's network. The sender (300) of FIG. 4 is a personal computer that has a network address on the sender's network. The receiver (302) of FIG. 4 is a server that has a network address on the receiver's network. Personal computers request a data communications connection to a server when accessing files, scripts, and so on stored on the server.

In the method of FIG. 4, the sender's network (324) and the receiver's network (325) are represented in data as the bits in a full network address corresponding to 1's in an address mask. Data elements representing the sender's network (324) and the receiver's network (325) respectively store values representing the networks on which the sender (300) and receiver (302) are located. The data communications module (186) may obtain the sender's network (324) from the result of a logical AND of the sender's network address with the receiver's network mask. Similarly, the data communications module (186) may obtain the receiver's network (325) from the result of a logical AND of the receiver's network address with the receiver's network mask.

In the method of FIG. 4, characterizing (340) the sender includes determining (820) whether the sender's network (324) is the receiver's network (325). Determining (820) whether the sender's network (324) is the receiver's network (325) may be carried out by comparing the value of the receiver's network (325) with the value of the sender's network (324) for equality. The data communications module (186) characterizes the sender as 'local' (826) if the sender's network (324) is the receiver's network (325). The data communications module (186) characterizes the sender as 'remote' (828) if the sender's network (324) is not the receiver's network (325).

Figure 5:
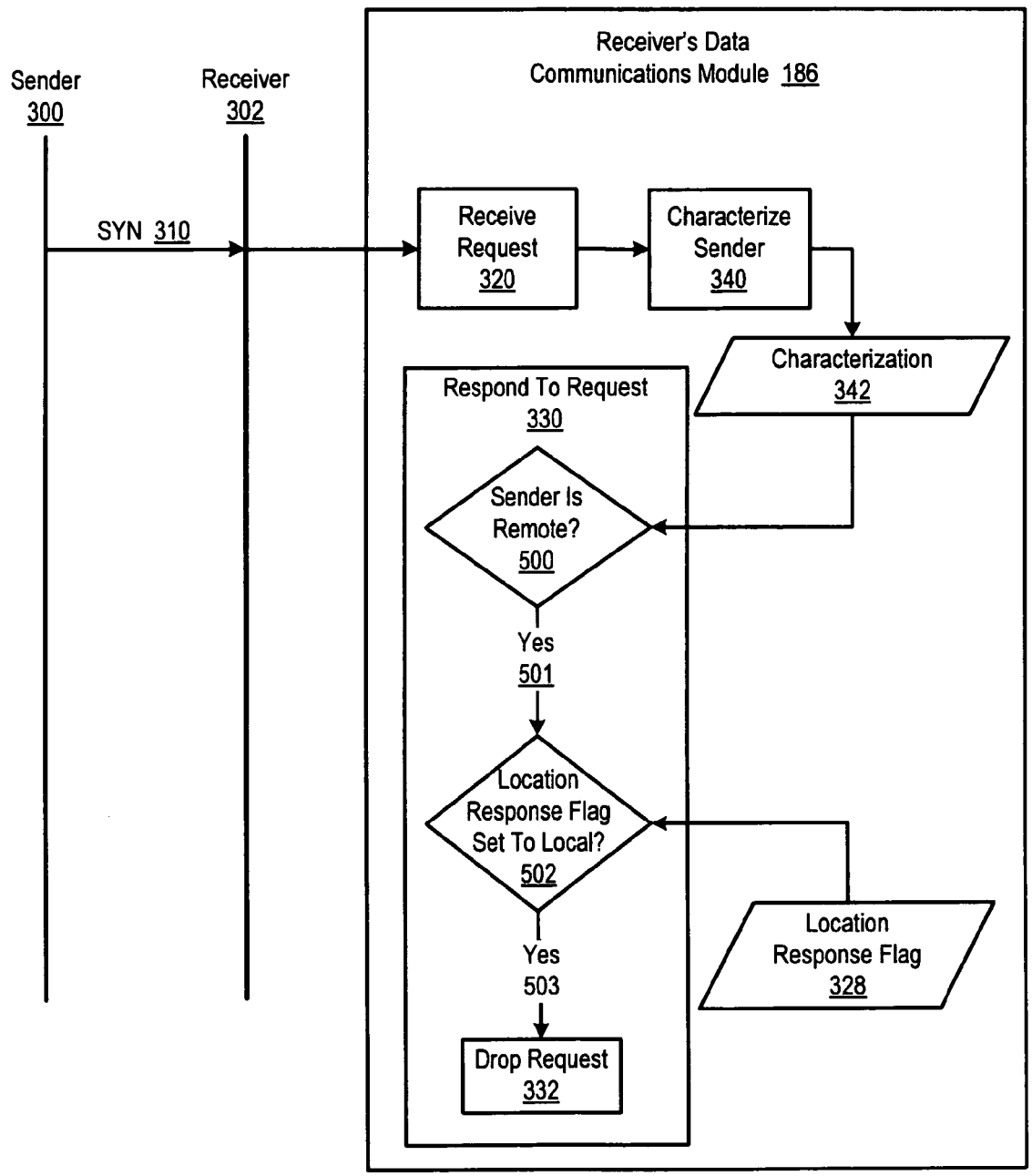
FIG. 5 sets forth a calling sequence diagram and flow chart illustrating a further exemplary method for administering requests for data communications connections according to embodiments of the present invention.

For further explanation, FIG. 5 sets forth a calling sequence diagram and flow chart illustrating a further exemplary method for administering requests for data communications connections according to embodiments of the present invention. The method of FIG. 5 includes receiving (320) a request (321) for a data communications connection, characterizing (340) the sender (300), and responding (330) to the request (321) in dependence upon a value of a location response flag (328) and in dependence upon the characterization (342) of the sender's network (324) with respect to the receiver's network (325), all implemented in a similar fashion as the method of FIG. 3. In the method of FIG. 5, however, responding (330) to the request is carried out by dropping (332) the request if the value of the location response flag (328) is set to 'local' (503) and the sender (300) is characterized as remote (501). This method is particularly useful, for example, in providing enterprise services to local users, when local requests for connections to open ports may be accepted and local requests for connections to closed ports may be reset in the traditional fashion because local users are relatively trusted. Remote users, however, are given no response whatsoever, not even a reset, thereby denying them any information whatsoever regarding the receiver.

Figure 6:
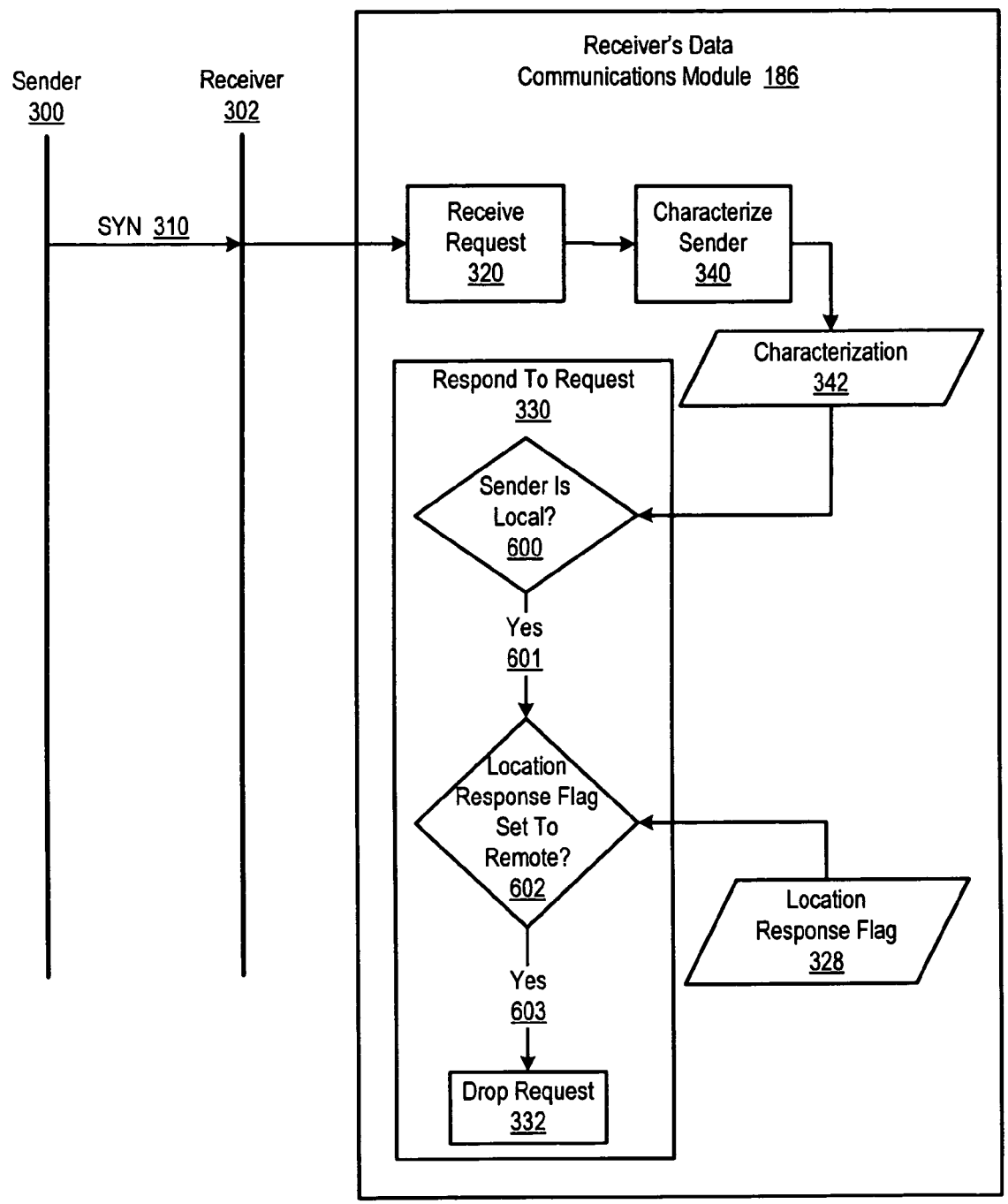
FIG. 6 sets forth a calling sequence diagram and flow chart illustrating a still flirter exemplary method for administering requests for data communications connections according to embodiments of the present invention.

For further explanation, FIG. 6 sets forth a calling sequence diagram and flow chart illustrating a still further exemplary method for administering requests for data communications connections according to embodiments of the present invention. The method of FIG. 6 includes receiving (320) a request (321) for a data communications connection, characterizing (340) the sender (300), and responding (330) to the request (321) in dependence upon a value of a location response flag (328) and in dependence upon the characterization (342) of the sender's network (324) with respect to the receiver's network (325), all implemented in a similar fashion as the method of FIG. 3. In the method of FIG. 6, however, responding (330) to the request is carried out by dropping (332) the request if the value of the location response flag (328) is set to 'remote' (603) and the sender (300) is characterized as local (601). This method is particularly useful, for example, in providing online commercial services to remote users, when local users ought not be requesting connections through the addresses and ports exposed for commercial use. In this example, remote requests for connections to open ports may be accepted and remote requests for connections to closed ports may be reset in the traditional fashion because connections from remote user are desired. Local users, however, are given no response whatsoever, not even a reset, thereby denying them any information whatsoever regarding the receiver.

As mentioned above in the discussion of the system of FIG. 2, a receiver may have a receiver port having a state. With reference to FIG. 3: In the method of FIG. 3 responding (330) to a request (321) may be carried out, not only in dependence upon the characterization (342) of the sender and the value of the location response flag (328), but also in dependence upon the receiver port state (326). For further explanation of the use of the port state, FIG. 7 sets forth a calling sequence diagram and flow chart illustrating a further exemplary method of administering requests for data communications connections according to embodiments of the present invention.

Figure 7:
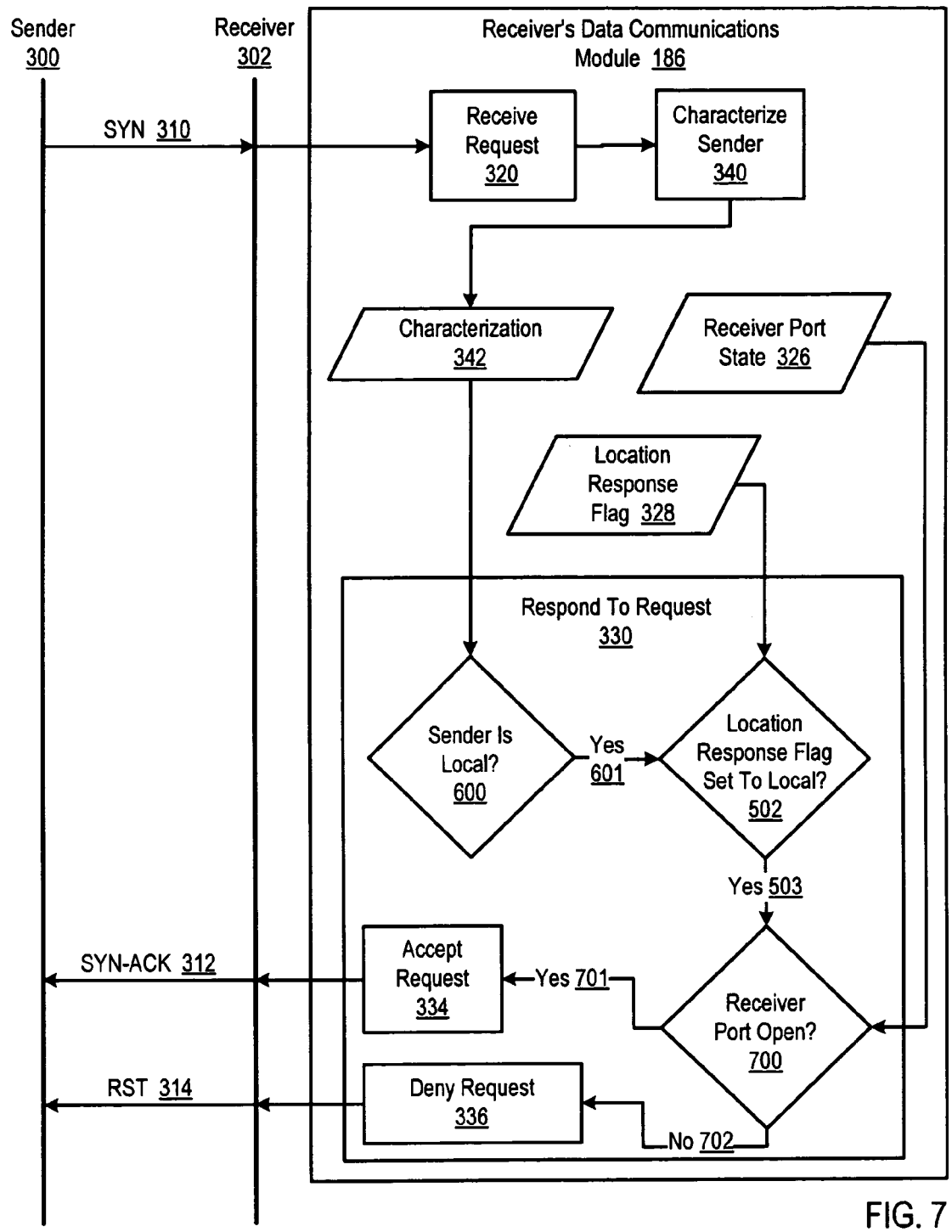
FIG. 7 sets forth a calling sequence diagram and flow chart illustrating a further exemplary method of administering requests for data communications connections according to embodiments of the present invention.

The method of FIG. 7 includes receiving (320) a request (321) for a data communications connection, characterizing (340) the sender (300), and responding (330) to the request (321) in dependence upon a value of a location response flag (328) and in dependence upon the characterization (342) of the sender's network (324) with respect to the receiver's network (325), all implemented in a similar fashion as the method of FIG. 3. In the method of FIG. 7, however, the receiver (302) may include a receive port, such as, for example, the data communications application illustrated at reference (152) on FIG. 2, and the receive port may have a receive port state (326).

The method of FIG. 7 includes determining (700) whether the receive port is open. Whether the receive port is open is the value of the port's state. That is, the port state is either open or closed. Receiver's data communications module (186) may, for example, maintain a list of the port numbers of the ports presently existing and listening on a socket. Or the port state may be inferred from data structures representing ports such as, for example, sockets or TCBs. In the case of TCP, for example, if no Transmission Control Block ('TCB') exists with a socket having a port number matching the receiver port number in the request for a connection, the port does not exist on the receiver and may therefore be considered closed.

In the method of FIG. 7, if the state (326) of the port is that the port is open (701) on the receiver (302), responding (330) to the request is carried out by accepting (334) the request if the value of the location response flag (328) is set to 'local' (503) and the sender (300) is characterized as local (601). In the example of TCP, accepting (334) the request by be carried out by transmitting a SYN-ACK message (312) from receiver (302) to sender (300) and then eventually completing a three way handshake to effect a connection.

Further in the method of FIG. 7, if the state (326) of the port is that the port is closed (702) on the receiver (302), responding (330) to the request is carried out by denying (336) the request if the value of the location response flag (328) is set to 'local' (503) and the sender (300) is characterized as local (601). In the example of TCP, denying (336) the request may be implemented by transmitting a reset message (314) from receiver (302) to sender (300).

Figure 8:
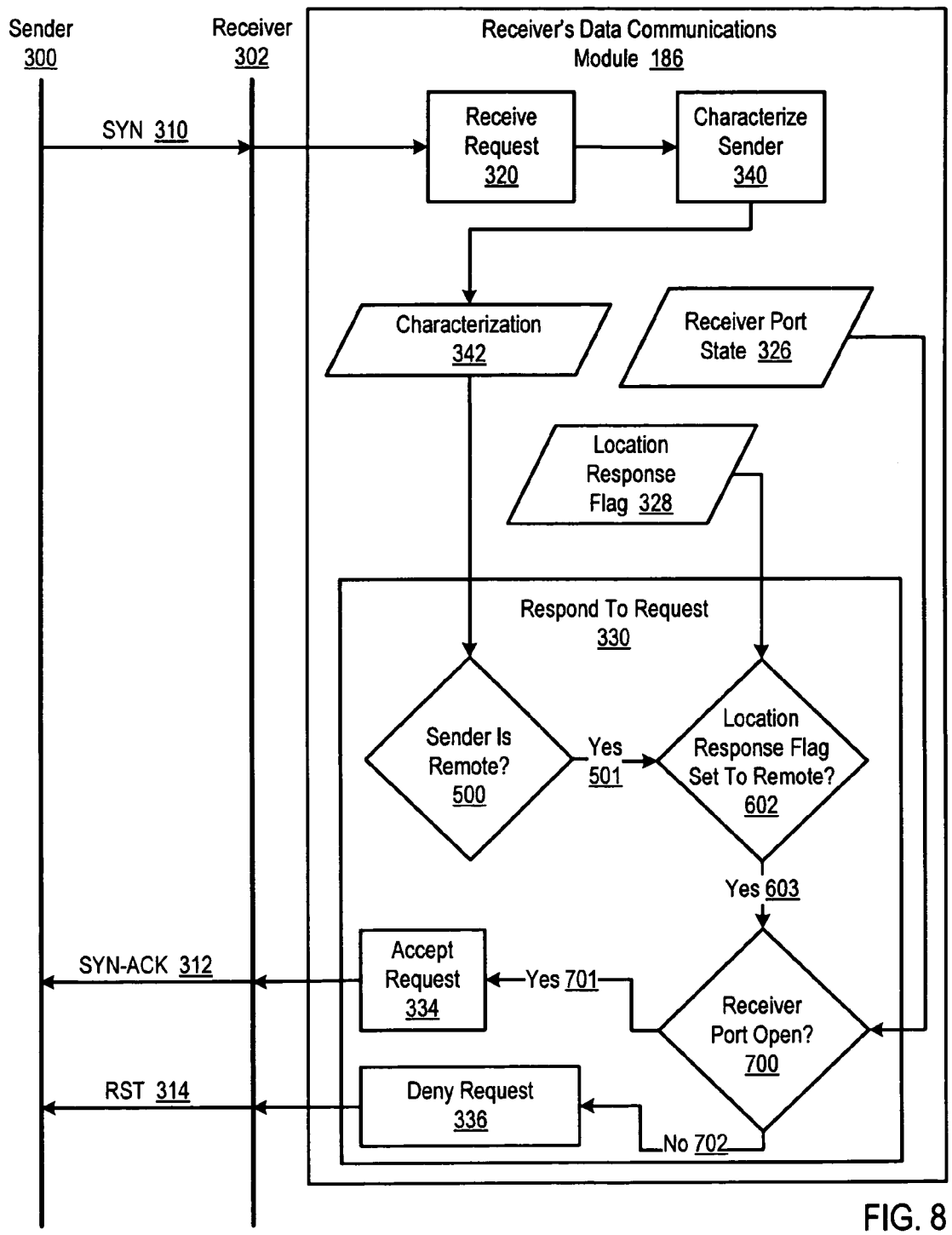
FIG. 8 sets forth a calling sequence diagram and flow chart illustrating a further exemplary method of administering requests for data communications connections according to embodiments of the present invention.

For further explanation of the use of the port state, FIG. 8 sets forth a calling sequence diagram and flow chart illustrating a further exemplary method of administering requests for data communications connections according to embodiments of the present invention. The method of FIG. 8 includes receiving (320) a request (321) for a data communications connection, characterizing (340) the sender (300), and responding (330) to the request (321) in dependence upon a value of a location response flag (328) and in dependence upon the characterization (342) of the sender's network (324) with respect to the receiver's network (325), all implemented in a similar fashion as the method of FIG. 3. In the method of FIG. 8, however, the receiver may include a receive port (not shown) having a receive port state (326).

The method of FIG. 8 includes determining (700) whether the receive port is open. In the method of FIG. 8, if the state (326) of the port is that the port is open (701) on the receiver (302), responding (330) to the request may be carried out by accepting (334) the request if the value of the location response flag (328) is set to 'remote' (603) and the sender (300) is characterized as remote (501). In the example of TCP, accepting (334) the request by be carried out by transmitting a SYN-ACK message (312) from receiver (302) to sender (300) and then eventually completing a three way handshake to effect a connection.

Further in the method of FIG. 8, if the state (326) of the port is that the port does not exist (702) on the receiver (302), responding (330) to the request may be carried out by denying (336) the request if the value of the location response flag (328) is set to 'remote' (603) and the sender is characterized as remote (501). In the example of TCP, denying (336) the request may be implemented by transmitting a reset message (314) from receiver (302) to sender (300).

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for administering requests for data communications connections in a wide area network that includes a plurality of networks, the method comprising:

receiving, according to a data communications protocol, by a receiver from a sender, a request for a data communications connection, wherein the sender has a network address on a sender's network, the receiver has a network address on a receiver's network, and the receiver has a receiver port having a state;

characterizing the sender as local with respect to the receiver's network if the sender's network is the receiver's network;

characterizing the sender as remote with respect to the receiver's network if the sender's network is not the receiver's network;

setting a value of a location response flag by an application program's subroutine call through an application programming interface for the data communications protocol; and responding to the request in dependence upon:
the value of the location response flag;
the characterization of the sender's network with respect to the receiver's network; and
the receiver port state, wherein the receiver port state is either a closed port state or an open port state and wherein:
a closed port state is the state of a port that either does not exist or the state of a port that has not been instructed to listen; and
an open port state is the state of a port that exists and has been instructed to listen.

2. The method of claim 1 wherein responding to the request further comprises dropping the request if the value of the location response flag is set to 'local' and the sender is characterized as remote.

3. The method of claim 1 wherein responding to the request further comprises dropping the request if the value of the location response flag is set to 'remote' and the sender is characterized as local.

4. The method of claim 1 wherein the state of the port is that the port is open on the receiver and responding to the request further comprises accepting the request if the value of the location response flag is set to 'local' and the sender is characterized as local.

5. The method of claim 1 wherein the state of the port is that the port is closed on the receiver and responding to the request further comprises denying the request if the value of the location response flag is set to 'local' and the sender is characterized as local.

6. The method of claim 1 wherein the state of the port is that the port is open on the receiver and responding to the request further comprises accepting the request if the value of the location response flag is set to 'remote' and the sender is characterized as remote.

7. The method of claim 1 wherein the state of the port is that the port is closed on the receiver and responding to the request further comprises denying the request if the value of the location response flag is set to 'remote' and the sender is characterized as remote.

8. A system for administering requests for data communications connections in a wide area network that includes a plurality of networks, the system comprising:
  A system bus;
  A processor coupled with the system bus; and
  A computer recording medium coupled with the system bus, the computer recording medium having computer program instructions stored therein; the computer program instructions configured to:
  receive, according to a data communications protocol, by a receiver from a sender, a request for a data communications connection, wherein the sender has a network address on a sender's network, the receiver has a network address on a receiver's network, and the receiver has a receiver port having a state;
  characterize the sender as local with respect to the receiver's network if the sender's network is the receiver's network;
  characterize the sender as remote with respect to the receiver's network if the sender's network is not the receiver's network;
  set the value of the location response flag by an application program's subroutine call through an application programming interface for the data communications protocol; and
  respond to the request in dependence upon:
  the value of the location response flag;
  the characterization of the sender's network with respect to the receiver's network; and
  the receiver port state, wherein the receiver port state is either a closed port state or an open port state and wherein:
  a closed port state is the state of a port that either does not exist or the state of a port that has not been instructed to listen; and
  an open port state is the state of a port that exists and has been instructed to listen.

9. The system of claim 8 wherein the program instructions configured to respond to the request further comprises for the program instructions configured to drop the request if the value of the location response flag is set to 'local' and the sender is characterized as remote.

10. The system of claim 8 wherein the program instructions configured to respond to the request further comprises for the program instructions configured to drop the request if the value of the location response flag is set to 'remote' and the sender is characterized as local.

11. A computer program product for administering requests for data communications connections in a wide are network that includes a plurality of networks; the computer program product comprising:
  a recording medium having computer program instructions recorded thereon, wherein the recording medium is not a signal, the program instructions configured to:
  receive, according to a data communications protocol, by a receiver from a sender, a request for a data communications connection, wherein the sender has a network address on a sender's network, the receiver has a network address on a receiver's network, and the receiver has a receiver port having a state;
  characterize the sender as local with respect to the receiver's network if the sender's network is the receiver's network;
  characterize the sender as remote with respect to the receiver's network if the sender's network is not the receiver's network;
  set the value of the location response flag by an application program's subroutine call through an application programming interface for the data communications protocol; and
  respond to the request in dependence upon:
  the value of the location response flag;
  the characterization of the sender's network with respect to the receiver's network; and
  the receiver port state, wherein the receiver port state is either a closed port state or an open port state and wherein:
  a closed port state is the state of a port that either does not exist or the state of a port that has not been instructed to listen; and
  an open port state is the state of a port that exists and has been instructed to listen.

12. The computer program product of claim 11 wherein the program instructions configured to respond to the request further comprises for the program instructions configured to drop the request if the value of the location response flag is set to 'local' and the sender is characterized as remote.

13. The system of claim 10 wherein the program instructions configured to respond to the request further comprises for the program instructions configured to drop the request if the value of the location response flag is set to 'remote' and the sender is characterized as local.

* * * * *